United States Patent [19]
Snell et al.

[11] Patent Number: 5,837,775
[45] Date of Patent: Nov. 17, 1998

[54] GOLF BALL COMPOSITION

[75] Inventors: Dean A. Snell, Oceanside, Calif.; Barbara Stefani Levitt, Lakeville, Mass.

[73] Assignee: Acushnet Company, Fairhaven, Mass.

[21] Appl. No.: 745,138

[22] Filed: Nov. 7, 1996

Related U.S. Application Data

[63] Continuation-in-part of Ser. No. 603,796, Feb. 20, 1996, Pat. No. 5,670,579, which is a continuation of Ser. No. 56,046, Apr. 30, 1993, Pat. No. 5,492,972, which is a continuation-in-part of Ser. No. 625,225, Dec. 10, 1990, abandoned.

[51] Int. Cl.$^6$ .......................... A63B 37/00; A63B 37/06; A63B 37/12
[52] U.S. Cl. .......................... 525/221; 473/372; 473/377; 473/385
[58] Field of Search .................... 473/372, 377, 473/385; 525/221

[56] References Cited

U.S. PATENT DOCUMENTS

| | | | |
|---|---|---|---|
| 3,264,272 | 8/1966 | Rees | 260/78.5 |
| 3,454,280 | 7/1969 | Harrison et al. | 273/235 |
| 3,819,768 | 6/1974 | Molitor | 260/897 B |
| 3,940,146 | 2/1976 | Little | 273/235 R |
| 4,274,637 | 6/1981 | Molitor | 273/235 R |
| 4,323,247 | 4/1982 | Keches et al. | 273/235 R |
| 4,508,309 | 4/1985 | Brown | 249/81 |
| 4,526,375 | 7/1985 | Nakade | 273/235 R |
| 4,679,795 | 7/1987 | Melvin et al. | 273/235 R |
| 4,715,607 | 12/1987 | Llort | 525/232 |
| 4,798,386 | 1/1989 | Berard | 273/235 R |
| 4,858,924 | 8/1989 | Saito et al. | 273/235 R |
| 4,884,814 | 12/1989 | Sullivan | 273/235 R |
| 4,911,451 | 3/1990 | Sullivan et al. | 273/235 R |
| 4,986,545 | 1/1991 | Sullivan | 273/235 R |
| 5,000,459 | 3/1991 | Isaac | 273/235 R |
| 5,072,944 | 12/1991 | Nakahura | |
| 5,116,060 | 5/1992 | Sullivan | 525/265 |
| 5,120,791 | 6/1992 | Sullivan | 525/221 |
| 5,367,028 | 11/1994 | Hamada | |
| 5,492,972 | 2/1996 | Stefani | 525/221 |
| 5,538,794 | 7/1996 | Cadorniga | 525/221 |

FOREIGN PATENT DOCUMENTS

| | | | |
|---|---|---|---|
| 779825 | 3/1968 | Canada | 273/235 R |
| 490619 | 6/1992 | European Pat. Off. | |
| 2277932 | 11/1994 | United Kingdom | |
| 00212 | 1/1995 | WIPO | 525/221 |

*Primary Examiner*—David Buttner
*Attorney, Agent, or Firm*—Pennie & Edmonds LLP

[57] ABSTRACT

The golf ball composition is comprised of a core with a compression of less than about 90 and a cover made from more than about 50% of a sodium or zinc ionomer resin having a softening termonomer and a flexural modulus of less than about 10,000 psi and less than about 50% of a lithium ionomer resin. The ball has very good performance and has excellent shear resistance.

15 Claims, 1 Drawing Sheet

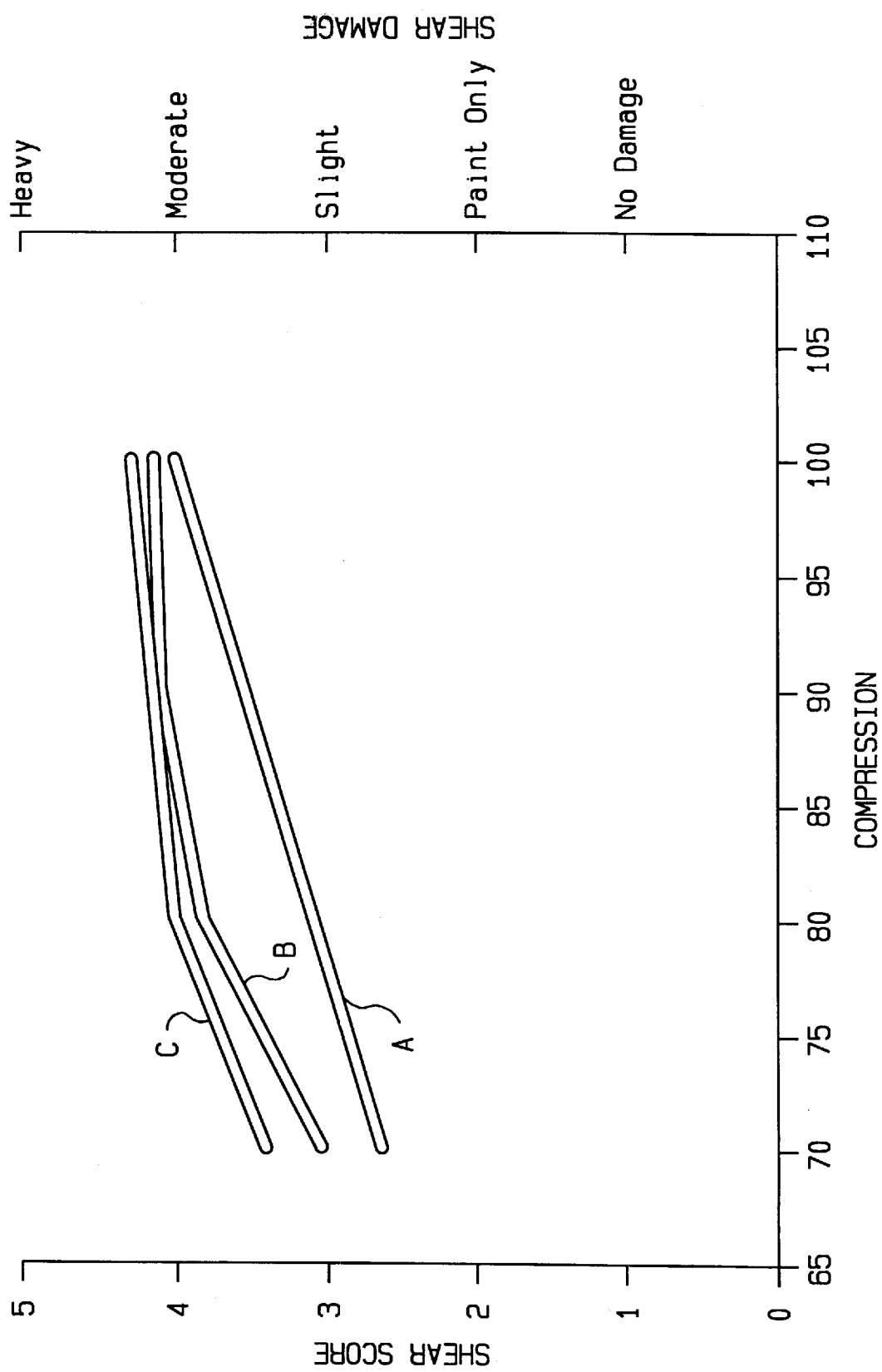

GOLF BALL COMPOSITION

This application is a continuation-in-part of U.S. patent application Ser. No. 08/603,796, filed Feb. 20, 1996, now U.S. Pat. No. 5,670,579, which is a continuation application of U.S. patent application Ser. No. 08/056,046, now U.S. Pat. No. 5,492,972, filed Apr. 30, 1993, which is a continuation-in-part of U.S. patent application Ser. No. 07/625,225, filed Dec. 10, 1990 now abandoned.

FIELD OF THE INVENTION

This invention relates to golf balls and, more particularly, to a golf ball having improved core and cover compositions. The core is a low compression core and the cover comprises a blend of a sodium ionomer resin having a low flexural modulus and a lithium ionomer resin. A golf ball made with the core and cover compositions of the present. invention has been found to have good shear resistance.

BACKGROUND OF THE INVENTION

Generally, there are three types of golf balls in the market today, namely one-piece, two-piece and wound. One-piece golf balls are molded from a homogeneous mass of material, while two-piece golf balls are made by molding a cover about a solid core. Wound golf balls are made by molding a cover about a wound core. A wound core is prepared by winding thin elastic thread about a center.

Golf ball cores, whether wound or solid, typically measure from 1.4 to 1.6 inches (3.5 to 4.1 cm) in diameter. The cover is molded about the core to form a golf ball having the minimum United States Golf Association (USGA) specified diameter of 1.68 inches (4.3 cm). Typically, the cover has a 30 thickness of about 0.04 inches (0.1 cm).

Conventionally, both two-piece and wound golf balls are made by molding covers about cores in one of two ways: by injection molding cover material around a core which is held in a retractable pin mold; or by compression molding preformed half-shells about the core. The preformed half-shells are formed by injecting cover material into half-shell molds and solidifying the cover material into a half-shell shape.

Balata was the standard cover stock material until the middle 1960's when E. I. DuPont de Nemours and Co. discovered a new species of resins known as ionomers or ionomer resins. These resins are sold under the trademark SURLYN® and, to a large extent, have replaced balata as a cover stock material. Chemically, these ionomer resins are a copolymer of an olefin and an alpha, beta ethylenically unsaturated carboxylic acid with 10–90% of the carboxylic acid groups being neutralized by a metal ion; see U.S. Pat. No. 3,264,272. Today, the only commercially available ionomer resins are copolymers of ethylene and methacrylic or acrylic acid. Conventionally, these ionomer resins are distinguished by the type of metal ion, the amount of acid and the degree of neutralization.

Dunlop Rubber Company obtained the first patent on the use of Surlyn for the cover of a golf ball, see U.S. Pat. No. 3,454,280 issued Jul. 8, 1969. Since then, there have been a number of disclosures on the use of these ionomer resins in the cover composition of a golf ball. See, for example, U.S. Pat. No. 3,819,768 issued Jun. 25, 1974; U.S. Pat. No. 4,323,247 issued Apr. 6, 1982; U.S. Pat. No. 4,526,375 issued Jul. 2, 1985; U.S. Pat. No. 4,884,814 issued Dec. 3, 1989; and U.S. Pat. No. 4,911,451 issued Mar. 27, 1990.

In November 1986 DuPont introduced a sodium and zinc ionomer resin having a low flexural modulus and suggested using and blending the same with other ionomer resins for making a golf ball cover.

In December of 1986, DuPont introduced a lithium ionomer resin which was a copolymer of ethylene and methacrylic acid, optionally containing a softening acrylate comonomer. These lithium ionomer resins have a high flexural modulus, typically about 60,000 psi 9415 MPa). DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e. more durable) than a golf ball made from other known ionomer resins, e.g. sodium and zinc ionomer resins and blends thereof. DuPont further suggested that lithium ionomer resins could be used in blends with other ionomer resins where they can impart better cut resistance to these other materials.

U.S. Pat. No. 5,000,459 discloses the use of lithium ionomers and sodium ionomers. More particularly, the reference discloses that balls made from at least 50% of lithium ionomer resin have excellent durability.

The United States Golf Association (USGA) has promulgated a rule that no golf ball shall have an initial velocity that exceeds 255 feet (78 m) per second, i.e. 250 feet (76 m) per second with a 2% tolerance. Golf balls with covers made from ionomer resins with low flexural modulus are below this maximum and, as should be appreciated, all golf ball manufacturers strive to come as close as possible to this limit.

It has now been discovered that the initial velocity of a golf ball which uses a sodium ionomer resin having a low flexural modulus in the cover stock is increased by adding a lithium ionomer resin cover to the stock and that the shear resistance of the ball can be increased by using a core with a lower compression.

SUMMARY OF THE INVENTION

Broadly, the golf ball cover composition of the present invention is a blend comprising: about 95 to about 50 parts by weight based on 100 parts by weight resin (phr) of a low flexural modulus sodium ionomer resin; and about 5 to about 50 phr of a lithium ionomer resin.

More particularly, the present invention is directed to a golf ball comprising a core having a diameter of about 1.55 to 1.6 inches and a compression of less than about 90 and a cover comprised of a blend of greater than 50% of a first material and less than 50% of a second material, wherein the first material has a flexural modulus of less than 10,000 psi and the second material has a flexural modulus of greater than or about 60,000 psi. Preferably, the first material is a low modulus, flexural modulus of less than 10,000 psi, ionomer containing a softening butyl acrylate termonomer. The low modulus ionomer is more preferably comprised of a sodium ionomer, but could also include low modulus zinc ionomers. The second material is preferably a lithium ionomer.

It has been found that golf balls having a large diameter and low compression core combined with a cover having a low modulus ionomer has very good performance characteristics as well as improved shear resistance.

BRIEF DESCRIPTION OF THE DRAWING

FIG. 1 is a graph showing the effect of core compression on shear resistance for golf balls having a cover with more than 50% low flexural modulus sodium ionomer.

DETAILED DESCRIPTION OF THE PREFERRED EMBODIMENTS

A golf ball according to the present invention includes a core surrounded by a cover. The cover material is comprised of a blend of two materials, a very soft material and a harder material. Preferably, the cover is comprised of about 95 to about 50 parts by weight based on 100 parts by weight resin (phr) of a low flexural modulus sodium ionomer resin; and about 5 to about 50 phr of a lithium ionomer resin.

Preferably, the amount of low flexural modulus sodium ionomer resin used in the present invention is about 50 to about 70 phr and the amount of lithium ionomer resin used in the present invention is about 50 to about 30 phr.

Preferably, the sodium ionomer resin is a copolymer comprising about 95 to about 80 parts by weight of copolymer 35 of ethylene and about 5 to about 20 parts by weight of the copolymer of acrylic or methacrylic acid in which about 10% to about 90% of the acid groups are neutralized by sodium.

Preferably, the lithium ionomer resin is a copolymer comprising about 95 to about 80 parts by weight of ethylene and about 5 to about 20 parts by weight of acrylic or methacrylic acid based on 100 party by weight copolymer. Preferably, the lithium ionomer resin has about 10% to about 90% of the acid groups neutralized by lithium.

Preferably, the low flexural modulus sodium ionomer resin used in the present invention has a flexural modulus between about 1,000 and about 20,000 psi (5 and 140 MPa) and, more preferably, between about 2,000 and about 10,000 psi (10 to 70 MPa).

Preferably, the lithium ionomer resin has a high flexural modulus which is above about 60,000 psi (415 MPa). More preferably, the lithium ionomer resin used in the present invention has a flexural modulus between about 60,000 and about 80,000 psi (415 and 550 MPa). Good results have been obtained with the lithium ionomer resins having flexural moduli in the range of about 60,000 psi to about 70,000 psi (415 to 485 MPa). The flexural modulus is measured in accordance with A.S.T.M. Method D-790.

Both the lithium and sodium ionomer resins preferably have about 10% to about 90% of their carboxylic acid groups neutralized by their respective metal ions. More preferably, both the lithium and sodium ionomer resins have their carboxylic acid groups neutralized about 35% to about 65% by the metal ion.

Preferably, the ionomer resins have the same monocarboxylic acid, e.g. either methacrylic or acrylic acid.

To aid in the processing of the cover stock, it is conventional to use a plurality of ionomer resins to obtain the desired characteristics. Conventionally, ionomer resins with different melt flow indexes are employed to obtain the desired characteristics of the cover stock. In order to adjust the characteristics of the cover stock, other ionomer resins besides sodium and lithium can be employed.

Sodium ionomer resins sold by DuPont under the name SURLYN 8320, SURLYN 8269 and SURLYN 8265 also work well in the present invention. Good results have been obtained with a lithium ionomer resin sold under the trade name SURLYN 8118, 7930 and 7940 by DuPont.

SURLYN 8320, SURLYN 8269 and SURLYN 8265 contain a butyl acrylate softening termonomer such that they have flexural modulus of 2,800 psi (20 MPa), 2,800 (20 MPa), and 7,100 psi (50 MPa), respectively.[1] SURLYN 8118, 7930 and 7940 have flexural modulus of 61,000 psi (420 MPa), 67,000 psi (460 MPa) and 61,000 psi (420 MPa) respectively.

[1] Flexural modulus as published by DuPont.

SURLYN 8118, 7930 and 7940 have melt flow indexes of about 1.4, 1.8 and 2.6 g/10 min., respectively. SURLYN 8269 and SURLYN 8265 both have a melt flow index of about 0.9 g/10 min. Melt flow index is measured in accordance with A.S.T.M. Test D 1238, condition E, procedure A. Preferably, the blend of ionomer resins used to make a cover of a golf ball in accordance with the present invention has a melt flow index between about 1 to about 4 g/10 min. and, more preferably, about 1 to about 3 g/10 min.

The combined amount of lithium ionomer resin and sodium ionomer resin used to make a cover in accordance with the present invention as herein described generally makes up at least about 90% by weight of the total weight of the golf ball cover and, preferably, at least about 95% by weight. Additional materials which may be included in the golf ball cover are other SURLYN resins; whitening agents such as titanium dioxide; dyes; UV absorbers; optical brighteners; and other additives which are conventionally included in golf ball covers.

Golf ball covers made in accordance with the present invention are made in a conventional manner by molding cover stock about a core. Molding is accomplished either by injection molding cover stock about a core or by compression molding preformed half-shells about a core. The preferred method is compression molding. Half-shells are made by injection molding a cover stock into a conventional half-shell mold in a conventional manner.

The preformed half-shells are then placed about a core and the assembly is introduced into a compression molding machine. The compression molding machine is a hydraulic press having an upper and lower mold plate. As taught by U.S. Pat. No. 4,508,309 issued Apr. 2, 1985, such mold plate has half molds, each of which is registered with another half mold in the opposite mold plate. It has been found that a golf ball is formed with a cover in accordance with the present invention when the half-shells are compression molded about a core at about 300° F.(149° C.) for about 3 minutes. The molded balls are then cooled while still in the mold and finally removed when the cover is hard enough to be handled without deforming.

After the balls have been molded, they undergo various conventional finishing operations such as buffing, painting and stamping.

Preferably, the cover stock used to make a golf ball cover in accordance with the present invention is a blend of the lithium ionomer resin and the sodium ionomer resin in the amounts specified hereinabove. Blending of the ionomer resins is accomplished in a conventional manner using conventional equipment. Good results have been obtained by mixing the ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding over the core or to directly mold the cover about the core in a retractable-pin mold. Such machines are conventional.

These and other aspects of the present invention may be more fully understood by reference to the following examples.

EXAMPLE I

This example compares a series of golf balls made in accordance with the present invention and a series of golf balls having a cover made from a cover stock using only lithium ionomer resin or a sodium ionomer resin. The following ingredients are mixed to make cover stocks:

TABLE 1

| Ingredients | Cover Stock (Amounts phr) | | | | | |
|---|---|---|---|---|---|---|
| | A | B | C | D | E | F |
| Surlyn 8118 (Lithium) | 25 | 25 | 20 | 15 | — | 100 |
| Surlyn 8269 (Sodium) | 25 | — | — | — | — | — |
| Surlyn 8265 (Sodium) | 50 | 75 | 80 | 85 | 100 | — |
| Titanium Dioxide | 5 | 5 | 5 | 5 | 5 | 5 |
| Melt flows | 1.0* | 1.01* | 0.98* | 0.96* | 0.9 | 1.4 |

*calculated from the individual melt flows

The cover stocks were used to make half-shells in a conventional half-shell injection molding machine which heats the cover stock to 400° F. (204° C.) and injects the cover stock into molds. The half-shells were formed about the solid cores in a compression mold at 260°–280° F. (127°–138° C.) for 10 minutes of yield golf balls with diameters of about 1.68 inches (4.3 cm) and nominal cover thickness of about 0.04 inches (0.1 cm).

Each series of balls made from the cover stocks were tested for initial velocity, hardness and cut resistance. The results from these tests were as follows:

TABLE 2

| Initial Velocity | A | B | C | D | E | F |
|---|---|---|---|---|---|---|
| (ft/sec) | 247.45 | 247.54 | 247.26 | 247.02 | 246.41 | 251.32 |
| (m/sec) | 75.42 | 75.45 | 75.36 | 75.29 | 75.11 | 76.60 |
| Shore D Hardness | 54 | 58 | 56 | 55 | 50 | 69 |
| Cut Resistance | | | | | | |
| (inches) | 23 | 23 | 23 | 22 | 21 | 29 |
| (cm) | 58 | 58 | 58 | 56 | 53 | 74 |

The balls were also tested for shear resistance by projecting the ball against a wall and then visually observing the amount of wear on the cover. From this visual inspection it was noted that the ball made with cover stock E had the highest shear resistance while the ball made from cover stock F had the lowest. The balls made from cover stocks A–D showed good shear resistance which approached the shear resistance of the ball made from cover stock E.

In the guillotine test, a 8 pound knife (3629 grams) was impacted against the golf ball from various heights under the force of gravity. Cut resistance was determined by the maximum height to which the knife could be raised without cutting the cover of the golf ball on impact. A cut was defined as penetration completely through the cover; a mere crease in the golf ball was not considered to be a cut for testing purposes. The higher the blade had to be raised to cut the cover, the more cut resistant the golf ball was.

Shore D hardness is measured in accordance with A.S.T.M. D 2240-86 durometer hardness.

It is evident from the results in Table 2 above that the golf ball cover of the present invention produces a faster ball and a more cut resistant ball than a soft sodium ionomer resin alone.

Referring to FIG. 1, the compression of the ball core has an effect on the shear resistance of the golf balls having covers according to the present invention. Lines A, B and C represent balls having a 1.58 inch diameter core with more than 50% low modulus sodium ionomer. Line A represents the test results for a covers with 55% low modulus sodium ionomer; line B represents the test results for covers with 65% low modulus sodium ionomer and line C represents the results for covers with 75% low modulus sodium ionomer. More particularly, it is shown that as the percentage of low modulus sodium ionomer goes up, the shear resistance decreases. However, the shear resistance improved with the lower compression cores, particularly cores having a compression of about 90 or less.

EXAMPLE II

These and other aspects of the present invention may be more fully understood with reference to the following non-limiting example, which is merely illustrative of the preferred embodiment of the present invention golf ball core, and are not to be construed as limiting the invention, the scope of which is defined by the appended claims.

The results obtained with a golf ball core and balls prepared according to the examples are provided to show the improved performance characteristics of golf ball cores and covers made from the compositions of this invention. Example 1 represents a golf ball having a soft core with a 1.58 inch diameter and more than 50% of a low modulus ionomer (SURLYN 8320 has a flexural modulus of about 2,800 psi), according to the present invention. The preferred ionomer is a sodium ionomer, but others such a low modulus zinc ionomers could be used. Example 2 is representative of a golf ball having less than 50% low modulus ionomer and a harder core and is not within the present invention. The test results show the significant improvement in performance characteristics of Example 1 over the ball in Example 2. The test results do not show the improved feel that is achieved with the ball in Example 1. For example, because of the lower compression, the ball in Example 1 has a better feel when hit with a river and because of the softer cover, it has a better feel hen putting.

Table 3 sets forth the contents of the golf ball cores hat were made to illustrate the effect of using a softer core. The control core in Example 1 contains 33 pph zinc i acrylate and the softer core in Example 2 contains 39 pph zinc diacrylate. The compositions used to prepare the golf all cores of these examples are all in parts per hundred (pph), based on 100 parts of polybutadiene. The fillers used in the compositions of these examples are regrind and barium sulfate (BaSO$_4$). Vulcup 40KE® and Varox 231XL® are free radical initiators, and are a—a bis (t-butylperoxy) diisopropylbenzene and 1,1-di (t-butylperoxy) 3,3,5-trimethyl cyclohexane, respectively. Yel MB is a yellow pigment in a styrene butadiene binder, which is used to color the composition for identification purposes. The zinc diacrylate contained no more than about 4–8% zinc stearate.

All the ingredients except the peroxides were mixed in a Process Lab Brabender mixer to 82.2°–93.3° C. (180°–200° F.). The peroxides were added in the second stage to the initial mixture, and the resulting mixture was removed from the Brabender and blended on a lab mill to insure homogeneity. After mixing, the admixture was then hand rolled using a laboratory mill and cut into pieces or "preps". These preps were then compression molded at 160° C. (320° F.) for 15 minutes to form the cores. To fabricate the finished golf balls, the cores were ground and inserted into two cover hemispheres of the lithium-sodium blends of SURLYNO as set forth in Table 4, which were molded to encase the core.

The cores and balls prepared according to the above-described method were tested for compression and initial velocity. The compression ratings were obtained using a commercial compression tester manufactured and sold by ATTI Engineering in New Jersey. The initial velocity results were obtained from a standard technique, whereby the cores or balls are struck with a dual pendulum and pass through two light gates, which measure their speed. The initial velocity is then calculated from the measured speed according to standard equations, which correct the measured speed to a velocity equivalent to the velocity that would be measured if the ball were struck by the USGA testing machine. Both of these standard measurement techniques are well-known to those of ordinary skill in the art of making golf ball cores and balls. As shown in Table 5, reduction in the zinc diacrylate concentration in the Examples results in a decrease in core and ball compression and a drop in ball initial velocity.

TABLE 3

CORE COMPOSITIONS (pph)

| Example No. | 1 | 2 |
| --- | --- | --- |
| Polybutadiene | 100 | 100 |
| Regrind | 17 | 26 |
| Vulcup 40KE ® | 0.28 | 0.3 |
| Varox 231XL ® | 0.51 | 0.52 |
| $BaSO_4$ | 24.7 | 26.4 |
| Zinc Diacrylate | 33 | 39 |
| Zinc Oxide | 14 | 6 |

TABLE 4

COVER COMPOSITIONS

| Example No. | 1 | 2 |
| --- | --- | --- |
| SURLYN 8320 | 55 | 45 |
| SURLYN 7940 | 45 | 55 |
| Hardness | 55 | 59 |
| Flexural Modulus | 21.2 | 21.8 |

TABLE 5

| Example No. | 1 | 2 |
| --- | --- | --- |
| Ball Initial Velocity (ft/s) | 251.5 | 252.5 |
| Core Compression | 86 | 96 |
| Ball Compression | 88 | 100 |

TABLE 6

Spin Rate and Distance Test Results for a Driver

| Sample | Spin Rate (rpm) | Total Distance (yd)[2] |
| --- | --- | --- |
| Pinnacle Gold | 3000 | 262 |
| Titleist Tour Balata | 3900 | 249 |
| Example 1 | 3350 | 256 |
| Example 2 | 3500 | 256 |

[2]Total Distance is the carry and roll under conditions similar to the USGA's used for the Overall Distance Standard test.

TABLE 7

Spin Rate Test Results for an 8 Iron

| Sample | Spin Rate (rpm) |
| --- | --- |
| Pinnacle Gold | 7800 |
| Titleist Tour Balata | 9150 |
| Example 1 | 8150 |
| Example 2 | 8250 |

TABLE 8

Spin Rate Test Results for a Full Wedge

| Sample | Spin Rate (rpm) |
| --- | --- |
| Pinnacle Gold | 7150 |
| Titleist Tour Balata | 10,700 |
| Example 1 | 9750 |
| Example 2 | 8800 |

TABLE 9

Spin Rate Test Results for a 50 Yard Wedge

| Sample | Spin Rate (rpm) |
| --- | --- |
| Pinnacle Gold | 3800 |
| Titleist Tour Balata | 7100 |
| Example 1 | 6700 |
| Example 2 | 6100 |

The Pinnacle Gold ball is comprised of a 1.51 inch diameter polybutadiene core covered with a Li/Na blend SURLYN and has a "low spin rate". This ball is considered a good distance ball. The Titleist Tour Balata ball is comprised of a wound core covered by a balata rubber cover and has a "high spin rate". This ball is considered to be the best performance ball, but is not a good distance ball.

The test results in Tables 6–9 show that the ball having more than 50% low modulus sodium ionomer according to the present invention, Example 1, has significantly better performance characteristics than the ball that has less than 50% low modulus sodium ionomer, even though the initial speed of the ball in Example 1 is less. Since the core of the ball in Example 1 has a lower compression than the ball in Example 2, the spin rate off the driver is less, closer to the Pinnacle ball. Thus, the overall distance of the balls according to Examples 1 and 2 are equal. However, the spin rates for the golf ball in Example 1 were much better than the ball in Example 2, i.e., the spin rate of Example 1 off the wedge and half-wedge was closer to the Tour Balata ball. Thus, a ball according to the present invention provides good distance with a driver and high spin rates with the short irons. Moreover, the ball according to the present invention has a lower compression, about 90 points or lower, and thus, a good feel when hit with a driver. The ball according to the present invention also has a softer cover, Shore D of about 60 or less, and therefore, has a better feel when putted.

As indicated above, the cover can effect the initial velocity of a golf ball. In order to keep a good initial velocity with a soft cover according to the present invention, the core must be relatively large, i.e., the core should have a diameter of about 1.55 to 1.6 inches. Most preferably, the ball has a core diameter of about 1.58 inches.

It will be understood that the claims are intended to cover all changes and modifications of the preferred embodiments of the invention, herein chosen for the purpose of illustration, which do not constitute a departure from the spirit and scope of the invention.

We claim:

1. A golf ball comprising:
   a core having a compression of about 90 points or less; and
   a cover that surrounds the core, the cover comprised of a blend of less than 50% of a lithium ionomer resin having a first flexural modulus, more than 50% of a sodium ionomer resin having a second flexural modulus that is less than the first flexural modulus, and the sodium ionomer resin further includes a softening butyl acrylate termonomer.

2. The golf ball of claim 1 wherein said second flexural modulus is between about 2,000 and 10,000 psi.

3. The golf ball of claim 1 wherein said first flexural modulus is between about 60,000 and 70,000 psi.

4. The golf ball of claim 1 wherein the sodium ionomer resin is comprised of first and second sodium ionomers that have different flexural moduli.

5. The golf ball of claim 4 wherein the compression is about 86 or less and the core has a diameter of about 1.55 to 1.6 inches.

6. A golf ball comprising:
   a core having a diameter between about 1.55 and 1.6 inches and a predetermined compression; and
   a cover that surrounds the core, the cover comprised of a blend of less than 50% of a first lithium ionomer resin having a first flexural modulus and more than 50% of a second ionomer resin having a softening butyl acrylate termonomer and a second flexural modulus that is different from the first flexural modulus and is less than about 10,000 psi;
   wherein the compression of the core and the composition of the cover are correlated with respect to each other such that the golf ball has a compression of about 90 points or less.

7. The golf ball of claim 6, wherein the second ionomer resin is comprised of a sodium metal ion.

8. The golf ball of claim 6, wherein the diameter of the core is about 1.58 inches.

9. A golf ball comprising:
   a core having a diameter between 1.55 and 1.6 inches and a compression of about 90 points or less; and
   a cover that surrounds the core, the cover comprised of a blend of less than 50% of a first lithium ionomer resin having a first flexural modulus and more than 50% of a second ionomer resin having a softening butyl acrylate termonomer and a second flexural modulus that is less than about 10,000 psi.

10. The golf ball of claim 9, wherein the second flexural modulus is between about 2000 psi and 7000 psi.

11. The golf ball of claim 10, wherein the cover has a Shore D hardness of about 58 or less.

12. The golf ball of claim 11, wherein the first flexural modulus is greater than about 60,000 psi.

13. The golf ball of claim 6, wherein the second ionomer resin is comprised of a zinc metal ion.

14. The golf ball of claim 9, wherein the diameter of the core is about 1.58 inches.

15. The golf ball of claim 9, wherein the second ionomer resin is comprised of a zinc metal ion.

* * * * *

UNITED STATES PATENT AND TRADEMARK OFFICE
CERTIFICATE OF CORRECTION

PATENT NO. : 5,837,775

DATED : November 17, 1998

INVENTORS : Dean A. Snell et al.

It is certified that errors appear in the above-identified patent and that said Letters Patent is hereby corrected as shown below:

On the title page, column 1, lines 12, delete "Related U.S. Application Data."

Column 1, lines 13-17, delete "[63] ... , abandoned."

Column 3, line 17, delete "35".

Column 6, line 39, change "river" to --driver--.

Column 6, line 40, change "hen" to --when--.

Column 6, line 41, change "hat" to --that--.

Column 6, line 43, change "i acrylate" to --diacrylate--.

Column 6, line 45, change "all" to --ball--.

Column 6, line 66, change "SURLYNO" to --SURLYN®--.

Column 7, line 55, insert the following after "TABLE 5" and before "TABLE 6":
--The following tables set forth the test data for the golf balls made in Examples 1 and 2 above.--

Signed and Sealed this

Fifteenth Day of June, 1999

Attest:

Q. TODD DICKINSON

*Attesting Officer*  Acting Commissioner of Patents and Trademarks